United States Patent

[11] 3,573,638

[72] Inventors Henry L. Cox, Jr.
Anapolis;
Carl O. Buhlman, Columbia, Md.

[21] Appl. No. 850,501
[22] Filed Aug. 15, 1969
[45] Patented Apr. 6, 1971
[73] Assignee The United States of America as represented by the Secretary of the Navy

[54] BIPOLAR THRESHOLD DETECTOR

10 Claims, 3 Drawing Figs.

[52] U.S. Cl. 328/115, 307/235, 328/146, 330/30
[51] Int. Cl. H03k 5/20
[50] Field of Search 307/235; 328/115—118, 146, 147; 330/30, 69

[56] References Cited

UNITED STATES PATENTS

| | | | |
|---|---|---|---|
| 2,752,489 | 6/1956 | Algrain | 328/146 |
| 3,509,474 | 4/1970 | Arnold | 328/118 |

*Primary Examiner*—Donald D. Forrer
*Assistant Examiner*—David M. Carter
*Attorneys*—Justin P. Dunlavey, Ervin F. Johnston and Thomas G. Keough

ABSTRACT: A pair of diodes steer signals into a bias network to block bipolar input signals having magnitudes within a preset range, and, to pass positive signal excursions exceeding the preset range, to one input of an operational amplifier, and, to direct negative signal excursions less than the bipolar range to another input of an operational amplifier. A quiescent positive output signal, representing a quiescent state when input signals are within the preset range is present at the amplifier output so long as the bipolar input signal stays within the preset range. When bipolar excursions exceed or are less than the preset range, the operational amplifier produces a negative output signal. A feedback loop connects the amplifier output to one of its inputs to ensure snap-action level detection by means of a regenerative feedback.

INVENTORS
HENRY L. COX, JR
CARL O. BUHLMAN
BY
Thomas G. Keough
Ervin F. Johnston
ATTORNEYS

BIPOLAR THRESHOLD DETECTOR

STATEMENT OF GOVERNMENT INTEREST

The invention described herein may be manufactured and used by or for the Government of the U.S. of America for governmental purposes without the payment of any royalties thereon or therefor.

BACKGROUND OF THE INVENTION

It is frequently necessary to determine whether an input signal is within the range spanned by two specified voltage levels or is outside of this range. These voltage levels, or thresholds, may have the same polarity, or one may be positive and the other negative, depending on design requirements. One well-known approach employs two separate level detectors, for example, differential amplifiers or "Schmitt" trigger circuits. The outputs of the two detectors are fed to appropriate logic circuitry to produce one of two possible output states, if the input signal is voltage between the two thresholds and to the other output state if the input signal is not between the thresholds.

Another threshold detection technique, utilizes a phase inverter generating an analogue inverse of the applied input signal. The inverse and the original input signal are compared in a full-wave rectifier circuit to create a composite unipolar waveform. A single level detector acts on the composite waveform to pass a representative signal when positive excursions of the original input signal and negative excursions, now appearing as positive signals in the composite waveform, exceed the predetermined signal level. Both of the foregoing approaches are unduly complex in operational form, although, in the latter case, only one level detector is required; but a full-wave rectifier circuit requires at least one operational amplifier to result in a substantially, similar number of components as the first detector circuit. Using these circuits is precluded where space is critical and reliability paramount due to the undue number of circuit components involved.

SUMMARY OF THE INVENTION

The present invention is directed to providing a circuit for producing an output signal representative of bipolar excursions of input signals beyond a preset range. An operational amplifier, having a first and a second input terminal, and an output terminal, is internally formed with circuitry ensuring a saturated quiescent, positive output signal when the bipolar excursions are within the preset range, and a saturated negative output signal, when the bipolar excursions are greater or less than the upper and lower threshold voltages embracing the preset range. A circuit input terminal feeds bipolar input signals through a diode network adapted for blocking bipolar currents representative of input signals within the preset range from the amplifier. Bipolar currents, representing input signals above and below the preset range, are passed through the diodes to the second and the first input terminals, respectively. A negative sink transferring negative sink current to the second input terminal and a positive source passing positive currents to the first terminal, ensures the generation of a stable saturated positive output signal, a quiescent state when the bipolar input signals are within the preset range, or the quiescent state. Additive currents appearing across a pair of resistors, each having the same value and, each connected between one of the two input terminals and ground, actuate the amplifier because of a small potential difference between the input terminals to drive the amplifier at negative saturation to produce the negative output signal, when bipolar current is greater than or less than bipolar signals representative of the preset range. Amplifier actuation is effected by signals appearing at either terminal rendering the second terminal more positive with respect to the first terminal. A feedback loop ensures saturated amplifier stabilization when said amplifier transfers the positive output signal and ensures a rapid transition from the saturated positive output signal to a saturated negative output signal when a saturated negative output signal appears at the amplifier's output.

Therefore, it is an object of the present invention to provide a bilevel threshold detector.

Another object of the invention is to provide a circuit having inherent great reliability by reason of a reduced number of circuit components.

A further object is to provide a bilevel threshold detector circuit possessing high temperature stability.

Yet another object is to provide a threshold detection circuit by having an adjustable symmetrical and asymmetrical bilevel threshold detection capability with respect to ground.

An ultimate object of the invention is to provide a circuit ideally formed as an integrated circuit having a minimum number of components, and, hence, possessing small size and high reliability.

These and other objects of the invention will become readily apparent from the ensuing description when taken with the drawings.

DESCRIPTION OF THE PREFERRED EMBODIMENTS

Figure 1:
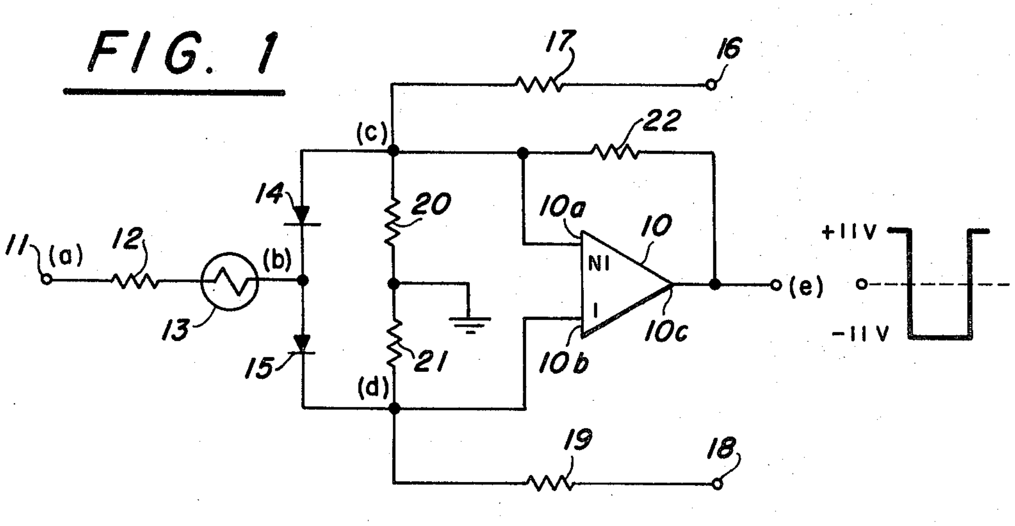
FIG. 1 is a schematic circuit diagram of the invention.

Referring now to the drawings, an integrated circuit operational amplifier 10, having an internal plus-and-minus voltage supply connection, is shown having a noninverting first input 10*a*, an inverting second input 10*b*, and an output 10*c*. Within its intended application and its internal configuration, first input 10*a* is said to be noninverting in the sense that a positive signal, appearing at the input, results in a positive signal at the output terminal 10*c*; a positive signal appearing at input 10*b* is inverted to form a negative output signal at the output terminal 10*c*. The integrated circuit is one of several well-known commercially available, types easily fabricated according to well-known techniques, to give desired outputs according to the inputs and logic functions desired. A circuit input terminal 11 receives bipolar input signals from remote circuitry and delivers them to an input resistor 12 and a temperature compensating resistor 13 forming a constant current source for the following circuit.

A first diode 14 and a second diode 15 interconnect input 11 to one of the two amplifier's inputs to transfer the negative and positive input signals, respectively. Also terminating at the amplifier inputs, a source of positive current consisting of a positive potential source 16 and a series positive current resistor 17, feeds positive current to the first input terminal, while a negative potential source 18, coupled to a negative current resistor 19 feeds negative currents to the second input terminal. A summing resistor 20 is connected between the first input terminal and ground to provide a combined signal across the first input terminal, and, another summing resistor 21 is connected between the second input terminal and ground to provide a total signal across the second input terminal.

Thusly configured, a bipolar threshold detector is provided, capable of remaining in a quiescent state, when bipolar signals representative of signals occurring within a preset range are impressed across the input terminal, and, for rapidly shifting to a negative output signal, when the incoming bipolar signals have magnitudes outside of the preset range. A stable positive output signal and a stable negative output signal is ensured by including, within the operational amplifier circuit, positive and negative supply potentials of sufficient magnitude to drive the amplifier at saturation at the positive and the negative levels.

For an understanding of the operation of the instant circuit, reference must be made to particular component values, it being understood that the choice of components is determined by the operational ranges.

If, in a representative circuit, a positive output signal of +11 volts is desired to represent the quiescent state for which the bipolar input signals are between −1.5 volts and +1.5 volts, and, it is further desired to have a negative output signal equaling −11 volts, that represents bipolar signals outside of the symmetrically located −1.5 volts and +1.5 volt limits, then the circuit component values must have the following: the internal supply connections of the operational amplifiers are set at ±12 volts with ground being at zero volts; positive potential source 16 and negative potential source 18 must have the values of +12 volts and −12 volts, respectively, with their serially connected resistors 17 and 19 each having a value of 300 kilohms; summing resistors 20 and 21, each have the value of 1.0 kilohm while feedback resistor 22 has a 1.0 megohm value; input resistor 12 has a value of 7.5 kilohms and temperature compensating resistor 13 has a value of approximately 2.7 kilohms, a representative commercially available item being Texas Inst. TG-⅛.

With the bipolar input signal thresholds being −1.5 volts and +1.5 volts, a drop of 520 millivolts occurs with a forward current of 91 microamperes requiring selecting appropriate diodes; here, in the representative embodiment, both diodes 14 and 15 are IN645's. The operational amplifier employed in the representative example is a μ A709. Using the aforenumerated circuit components, the IN645 diodes have a drop at 520 millivolts with a forward current of 91 microamperes. In addition, the saturation voltage level of the amplifier is ±11 volts, when ±12 volt internal supplies are used.

Looking now to FIG. 1 in the drawings, when the input terminal 11 has a potential value at (*a*) of zero, series positive current resistor 17 contributes 40 microamperes and feedback resistor 22 contributes 11 microamperes to the junction (*c*). The feedback current of 11 microamperes is produced by a quiescent positive output potential of +11 volts impressed on the output terminal at (*e*), and, thus, the quiescent potential at (*d*) is −40 millivolts. It can be seen, that the combined potential of +51 millivolts at (*c*) plus the −40 millivolts at (*d*) equals only 91 millivolts being impressed across the two diodes, an insufficient amount to cause conduction across the diodes. Since the noninverting input **10*a* is positive with respect to the inverting input 10*b***, the amplifier output is in positive saturation at the +11 volt level.

Here, it should be pointed out, that the positive current resistor 17, taken with its positive potential source 16, and, the negative current resistor 19, taken with its associated negative potential source 18, each form a constant current source of 40 microamperes to the diode network, or an essentially constant current sink of 40 microamperes to the diode network, respectively.

As the bipolar input signal is slowly raised from zero to the positive threshold of +1.5 volts embracing one-half of the preset range, no change occurs at (*d*) until the potential barrier inherent in the silicon diodes is overcome. As the +1.5 volt level is reached, the potential at (*b*) rises to about 450 millivolts, due to the potential drop across input resistor 12 and temperature compensating resistor 13. Diode 15 now begins to conduct. Since negative current resistor 19 looks like a constant current sink providing −40 microamperes, the net upward current across summing resistor 21 is equal to the current through diode 15 minus 40 microamperes. As the bipolar input continues to rise, increasing diode current through diode 15 causes the potential level at (*d*) to rise also. As soon as the potential at (*d*) approaches +51 millivolts, operational amplifier 10 begins to come out of positive saturation. At the point at which a transition from the quiescent saturated, positive output signal is switched to a negative output signal, the total diode current passed by diode 15 is 91 microamperes (40 microamperes going through negative current resistor 19 and 51 microamperes going through summing resistor 21).

At the positive threshold potential of +1.5 volts, the total voltage drop across input resistor 12 and temperature compensating resistor 13 is 928 millivolts. Since diode 15's drop is 520 millivolts and the potential at point (*d*) is at +51 millivolts, (*b*) is at +571 millivolts and point (*a*) is at +1.499 volts to roughly equal +1.5 volts. A saturated negative output signal of −11 volts appears on output terminal **10*c*** at (*e*) that is stable and the right-hand end of feedback resistor 22 has a −11 volt potential impressed across it. A resultant −11 volt potential impressed across it. A resultant −11 microampere feedback current flows to (*c*) and when added to the +40 microampere, current emanating from source 16 creates a potential at (*c*), after the transition to the negative output signal level, equal to +29 millivolts. A return to the quiescent original state of producing a positive output signal of +11 volts occurs when the diode current from diode 15 falls as the input bipolar signal is reduced to 69 microamperes. The 69 microampere level, different than the 91 microampere input required to switch the operational amplifier, is due to hysteresis of the components used.

Applying a negative bipolar input signal results in a 91 microampere current being drawn through diode 14 with relative potentials and currents in the circuit obtained by an analysis similar to that presented above.

From the foregoing description, it is readily apparent that the two most important design parameters of the circuit are the trigger levels at (*b*) and the corresponding diode currents. When these values are determined, the correct total resistance for the input resistor and the temperature-compensating resistor is calculated to give the desired threshold in excess of the minimum level (*b*). This minimum level has been measured to about 550 millivolts for certain silicon diodes and 200 millivolts for germanium diodes.

Temperature compensation is provided for the circuit by temperature-compensating resistor 13. As a design parameter, the condition for temperature compensation is that the voltage difference between (*a*) and (*d*), measured at the threshold current be constant as the temperature changes. If the ambient temperature rises, the voltage drop across conducting diode 14 or diode 15 decreases. In the instant representative example, the temperature-compensating resistor is a positive temperature coefficient resistor chosen to give a voltage drop increase, between any two specified temperatures equal to the decrease in the voltage drop across the diode between the same temperatures to maintain the upper and lower threshold levels defining the boundaries of the preset range within which an input bipolar signal does not switch from the quiescent positive output signal appearing at the output terminal.

Figure 2:
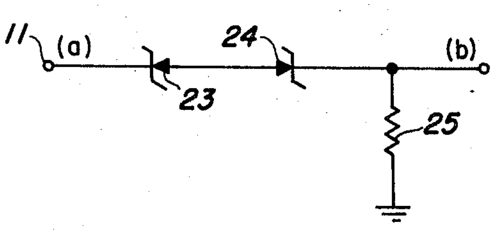
FIG. 2 is an alternate technique for temperature stabilization.
Figure 3:
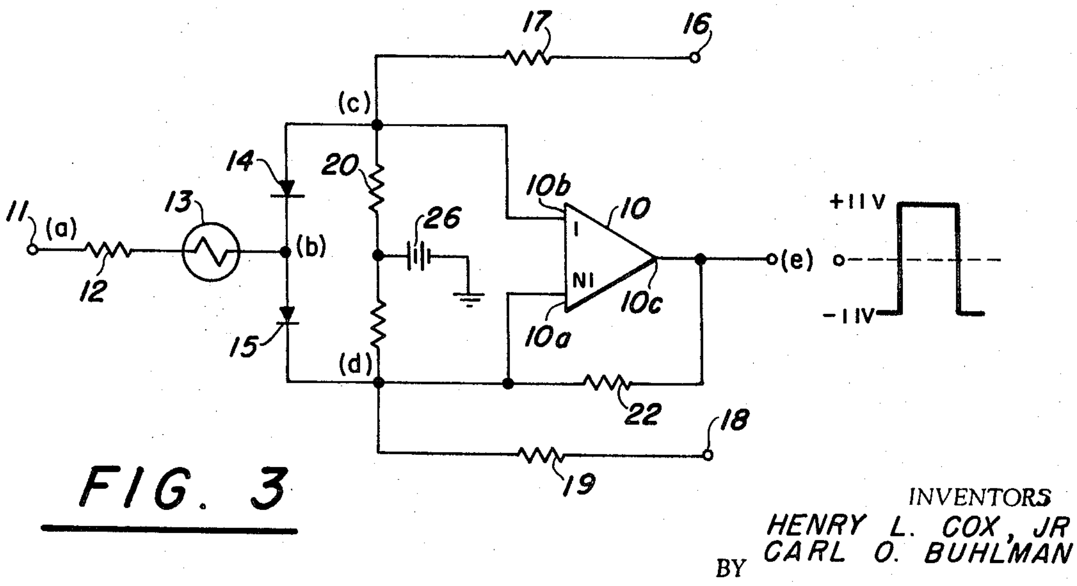
FIG. 3 is a circuit diagram of another embodiment of the invention producing a quiescent output signal of opposite polarity as the embodiment shown in FIG. 1 produces.

Noting FIG. 2, a pair of Zener diodes 23 and 24 is substituted in place of the input resistor 12 and temperature-compensating resistor 13 to effect temperature compensation without additional components. A bleeder resistor 25 is included to ground the Zener diode leakage.

As an alternate, the input-resistor temperature-compensating resistor combination or the Zener diode-bleeder-resistor combination can be eliminated by driving the entire circuit from a current source instead of a voltage source to eliminate the problem of temperature instability within the circuit.

If output polarities inverted from those described above are desired, they may be obtained by interchanging inverting and noninverting inputs **10*b* and 10*a* while keeping the feedback resistor 22 connected to the noninverting input 10*a***. This circuit configuration produces a saturated negative output signal of −11 volts, assuming all other components are identical to the embodiment set out above, and a saturated positive output signal of +11 volts.

As will be obvious to the designer, the threshold levels, and, hence, the preset range can be shifted simultaneously by inserting an appropriate source of DC bias voltage 26 between ground and the common junction of summing resistors 20 and 21. Also, the summing resistors can have discretely different values to shift the preset range to have an entirely positive value or an entirely negative value, such shifting and adding of biases being determined by the job at hand.

Obviously, many modifications and variations of the present invention are possible in the light of the above teachings, and, it is therefore understood that within the scope of the disclosed inventive concept, the invention may be practiced otherwise than as specifically described.

We claim:

1. A circuit for producing an output signal representative of bipolar excursions of input signals beyond a preset range comprising:

an operational amplifier having a first input terminal, a second input terminal, and an output terminal formed with associated circuitry for producing a quiescent positive output signal when a combined signal impressed on said first input terminal is positive with respect to a total signal impressed on said second input terminal, and, for passing a negative output signal when said total signal is positive with respect to said combined signal;

a circuit input terminal having means for converting said bipolar input signals to representative bipolar currents;

a diode network coupling said circuit input terminal to said amplifier being adapted for blocking said bipolar currents representative of signals within said preset range and for passing greater said bipolar currents to said second input terminal and for passing lesser said bipolar currents to said first input terminal;

a negative sink coupled to transfer a negative sink current to said second input terminal;

a positive source coupled to deliver a positive current to said first terminal for ensuring said quiescent positive output signal as said diodes block said bipolar currents representative of said preset range;

first means connected between said first input terminal and ground for summing said lesser said bipolar currents and said positive current to create said combined signal; and second means connected between said second input terminal and ground for summing said greater said bipolar currents and said negative sink current to create said total signal to ensure said negative output signal when said total signal is positive with respect to said combined signal.

2. A circuit according to claim 1 further including: a feedback loop joining said output terminal to said first terminal being adapted for passing a portion of said quiescent positive output signal for amplifier stabilization, and for passing a negative feedback current portion of said negative output signal to ensure a rapid transition from said quiescent positive output signal to said negative output signal.

3. A circuit according to claim 2 further including: means for temperature compensating said diode network connected between said network and said circuit input terminal for providing stable thresholds at the upper and lower limits of said preset range irrespective of ambient temperature.

4. A circuit according to claim 3 further including: amplifier supply connections for driving said amplifier in saturation at levels of said quiescent positive output signal and said negative output signal.

5. A circuit according to claim 3 in which the temperature compensation means is a thermistor having a temperature coefficient of resistance inversely proportional to said diode network.

6. A circuit according to claim 3 in which said temperature-compensating means is a pair of back-to-back Zener diodes and a grounded bleeder resistor.

7. A circuit according to claim 5 in which said diode network is a first diode connected between said thermistor and said first input terminal orientated for passing said lesser said bipolar signals thereto, and, a second diode connected between said thermistor and said second input terminal orientated for passing said greater bipolar signals thereto.

8. A circuit according to claim 3 in which said first means and said second means are resistors, equal in value to symmetrically balance said thresholds with respect to ground.

9. A circuit according to claim 3 in which said first means and said second means are resistors each having discrete values to asymmetrically dispose said thresholds with respect to ground.

10. A circuit according to claim 2 in which said first input terminal and said second input terminal are reversed and said feedback loop joins said output terminal to said second terminal whereby a quiescent negative output signal appears at said output terminal when said bipolar currents representative of signals within said preset range are fed to said circuit input terminal and a positive output signal appears at said output terminal when said second input terminal is positive with respect to said first input terminal.